United States Patent [19]

Lorek

[11] Patent Number: 5,795,939
[45] Date of Patent: Aug. 18, 1998

[54] ADHESION BINDERS WITH GLUTARIMIDE UNITS

[75] Inventor: Serge Lorek, Pau, France

[73] Assignee: Elf Atochem S.A., France

[21] Appl. No.: 537,929

[22] PCT Filed: Apr. 28, 1994

[86] PCT No.: PCT/FR94/00488

§ 371 Date: Aug. 1, 1996

§ 102(e) Date: Aug. 1, 1996

[87] PCT Pub. No.: WO94/25524

PCT Pub. Date: Nov. 10, 1994

[30] Foreign Application Priority Data

Apr. 30, 1993 [FR] France ................... 93 05156

[51] Int. Cl.[6] ........................................ C08F 8/32
[52] U.S. Cl. .................. 525/199; 525/217; 525/230; 525/330.5
[58] Field of Search .................... 525/199, 217, 525/230, 330.5

[56] References Cited

U.S. PATENT DOCUMENTS

| 4,272,585 | 6/1981 | Strassel . |
| 5,019,444 | 5/1991 | Duperray et al. . |

FOREIGN PATENT DOCUMENTS

| 0 216 505 | 4/1987 | European Pat. Off. . |
| 0 354 071 | 2/1990 | European Pat. Off. . |
| 0 438 239 | 7/1991 | European Pat. Off. . |
| 27 15 185 | 10/1977 | Germany . |

*Primary Examiner*—Bernard Lipman
*Attorney, Agent, or Firm*—Pennie & Edmonds LLP

[57] ABSTRACT

This invention provides an adhesion binder for binding fluorinated polymers, for example PVDF, with incompatible polymers such as polyamides. The binder is a polymer A which has glutarimide, acid, anhydric and acrylate units, and is useful for the production of fuel hoses. When mixed with a fluorinated polymer such as PVDF, copolymer A acts both as a binder and as a barrier.

9 Claims, No Drawings

ADHESION BINDERS WITH GLUTARIMIDE UNITS

TECHNICAL FIELD

The present invention relates to an adhesion binder containing glutarimide moieties and its application as a barrier material. It relates more particularly to the coextrusion with a layer or a film of fluorinated polymer and especially of polyvinylidene fluoride (PVDF).

PRIOR ART

EP 3,449 describes the coextrusion of PVDF with polyurethanes (PU); it is not necessary to use a binder. FR 2,436,676 describes the coextrusion of PVDF with polymethyl methacrylate (PMMA) and a poly(acrylonitrile-butadiene-styrene) (ABS), the PMMA film being between the PVDF and ABS films. Another example has been made with polyvinyl chloride (PVC) in place of ABS. EP 450,994 describes an improvement to the above technique, which uses as coextrusion binder the mixture:

27 to 50 parts of PMMA,
73 to 50 parts of a product itself consisting of 35 to 50 parts of PVDF per 100 parts, and
65 to 50 parts of acrylic or methacrylic elastomer.

This improvement increases the adherence of PVDF to ABS.

However, no coextrusion binder exists which is satisfactory for bonding a PVDF film to polyamide or to a product based on polyamide.

DESCRIPTION OF THE INVENTION

The Applicant has now found that a polymer A which contains the following moieties:

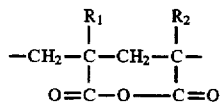

in which $R_1$ and $R_2$, which may be identical or different, represent H or a linear or branched alkyl having from 1 to 20 carbon atoms

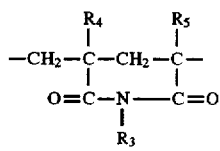

in which (i) $R_4$ and $R_5$, which may be identical or different, represent H or a linear or branched alkyl having 1 to 20 carbon atoms, (ii) $R_3$ represents H, an alkyl, cycloalkyl, aryl, alkaryl, aralkyl or a heterocycle

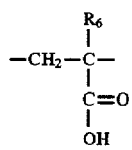

in which $R_6$ represents H or a linear or branched alkyl having from 1 to 20 carbon atoms

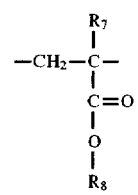

in which $R_7$ represents H or a linear or branched alkyl having from 1 to 20 carbons and $R_8$ represents a linear or branched alkyl having from 1 to 20 carbon atoms, is an adhesion binder for polyvinylidene fluoride (PVDF) which allows it to adhere to polymers which are incompatible with it. Polymer A may for example be a derivative of PMMA. It may be obtained by reaction of PMMA with ammonia or amines. Other polymers A and their preparation processes are described in EP 216,505. The moieties 3 advantageously represent less than 20% and preferably from 1 to 6% by weight of copolymer A.

Among the fluorinated polymers according to the invention, there may be mentioned:

homo- and copolymers of vinylidene fluoride (VF2), homo- and copolymers of trifluoroethylene (VF3)

homo- and copolymers, and especially terpolymers, combining the residues of chlorotrifluoroethylene (CTFE), tetrafluoroethylene (TFE), hexafluoropropene (HFP) and/or ethylene moieties and optionally VF2 and/or VF3 moieties. By way of example, there may be mentioned polytetrafluoroethylene (PTFE) and poly (ethylene-tetrafluoroethylene) (ETFE).

Fluorinated polymer is also understood to refer to mixtures of at least 70% by weight of the above with other polymers.

Among the fluorinated polymers, the homo- and copolymers of vinylidene fluoride possessing at least 70% by weight of VF2 residues, denoted throughout the text by PVDF, are advantageously used. PVDF is also understood to refer to the mixtures of the above with at least one other thermoplastic polymer, on condition that at least 50% by weight of VF2 moieties are present in the mixture.

Among the polymers which are incompatible with the fluorinated polymers, especially PVDF, there may for example be mentioned polyamides, copolyamides or polyamide alloys, on their own or as a mixture. By way of example of polyamides (PA), PA-4,6, PA-6,6, PA-6, PA-6, 12, PA-11, PA-12 and PA-12,12 or their mixtures may be mentioned. The polyamide alloys may be those consisting of a polyamide matrix in which are dispersed particles of another polymer, such as those described in the U.S. Pat. No. 4,174,358. The polyamides may contain plasticizers. The invention also relates to mixtures of polymer A with a polymer in order to lower its modulus of elasticity. In fact, the binder consisting of polymer A is too rigid for certain applications; it is useful to mix it with another polymer in order to render it less rigid. The amount of this polymer is chosen according to the desired rigidity. Fluorinated polymer modified by elastomers or a polymer which is compatible with polymer A may be used. The binder according to the invention may be used as coextrusion binder.

The invention also relates to the material containing three layers, namely a layer of PVDF, a layer of the binder according to the invention and a layer of a polymer which is incompatible with the fluorinated polymer, successively. These layers may be plates or films; they may be planar or cylindrical. They are for example pipes or tubes. The polymer which is incompatible with the fluorinated polymer is preferably a polyamide, a copolyamide or a polyamide alloy. This material containing three layers may be prepared by the usual techniques of coextrusion or of duplicate moulding. The three-layer material may be prepared by direct coextrusion or else, for example, the fluorinated polymer layer may be extruded, followed by a repeat extrusion or coextrusion of the layer of binder and the incompatible polymer layer on the layer of fluorinated polymer. It would not be departing from the scope of the invention if the material contained other layers; for example, on the fluorinated polymer layer there could be a polyurethane layer, that is to say that it would be in the order PA/binder based on polymer A/fluorinated polymer/PU. There could also be another binder on the fluorinated polymer layer, for example that described in EP 450,994, followed by a layer of ABS, that is to say that it would be in the order PA/binder based on polymer A/fluorinated polymer/binder/ABS. It is clear that the binder of the invention could also be present several times, that is to say that it would be in the order PA/binder based on polymer A/fluorinated polymer/binder based on polymer A/PA. A particularly advantageous form of this material is a tube whose outer layer is made of polyamide and whose inner layer is made of fluorinated polymer, and preferably of PVDF. This tube is useful for the supply of fuel to automobile engines.

For reasons of safety and of environmental protection automobile manufacturers impose mechanical characteristics on the fuel pipes: strength and flexibility, and characteristics of increased resistance to permeability. The pipes must be of the lowest possible permeability to petroleum products and to their additives, in particular to methanol.

Currently, polyamide pipes are commonly used in the automobile industry. Polyamides represent an ideal material for this pipe application, their mechanical strength being excellent and their flexibility being sufficient for a pipe to withstand the accumulation of flexion movements without breaking for virtually the entire lifetime of a vehicle. These pipes made of polyamide no longer meet the new demands of automobile manufacturers regarding permeability. With the increasing presence of methanol in petrol, the sensitivity of the pipes made of polyamide is revealed by a swelling of the pipe, resulting in a decrease in the mechanical properties, and in size modifications.

In order to overcome this disadvantage, while at the same time retaining the mechanical effects of polyamides, the subject of the invention consists in lining the inner wall of the polyamide pipe with a layer of fluorinated polymer, preferably of PVDF. The layer of fluorinated polymer is preferably as thin as possible in order to retain the maximum flexibility of the polyamide, given that fluorinated polymers, and especially PVDF, are not particularly reputed for their properties of suppleness.

It is recommended that, with the polyamide-based fuel supply pipes for engines generally having an outside diameter of 6 to 12 mm, the thickness of the inner layer of fluorinated polymer, preferably PVDF, is between 10 µm and 1 mm and that of the polyamide between 0.8 and 1.8 mm, the pipe being completed by an intermediary adhesion binder layer between the polyamide and the fluorinated polymer of 10 µm to 1 mm.

It is essential that the fluorinated polymer is efficiently bonded to the polyamide. A pipe which has no bonding between the fluorinated polymer and the polyamide cannot have a good flexibility and, consequently, cannot be easily folded or bent by hot forming; in this case, the thinnest material forms folds during the operation.

Moreover, if the two layers are not mutually bonded, the possible condensation of gases between the two layers may result in deformation of the thinnest part of the pipe with time. In addition, as the pipes are connected to one another, as well as to the fuel tank and to the carburettor, by pipe couplings, the latter cannot provide the leakproofing if they bear upon two dissociated layers. Finally, in the case where the thickness of the fluorinated polymer layer inside the tube is very thin, for example from 10 to a few tens of µm, and without ahesion, a pressure drop in the pipe irreversibly deforms the fluorinated polymer film, rendering the pipe unusable.

It is observed that such a tube consisting of an inner layer of fluorinated polymer bonded by the adhesion binder according to the invention to an outer layer of polyamide makes it possible to decrease the permeability by a factor of 10 relative to that of an equivalent pipe made of polyamide, while at the same time retaining the other properties, such as the cold impact strength, within the limits of the automobile manufacturers' specification sheets.

According to another form of the invention, the fuel pipe may be formed from a central layer of fluorinated polymer, preferably PVDF, with, on either side, a layer of the binder of the invention and a layer of polyamide, that is to say that the pipe has 5 layers: PA/binder based on polymer A/fluorinated polymer/binder based on polymer A/PA.

It would not be departing from the scope of the invention if the polyamide layer(s) comprised or essentially consisted of reground pipes, that is to say batches of pipes based on polyamide, and especially multilayer structures according to the invention, which are ground and optionally mixed with the polyamide. These regrinds may also be placed in an intermediate layer between the binder and the PA.

For fuel pipes, the binder based on polymer A is preferably mixed with fluorinated polymer and/or fluorinated polymer which is modified by an elastomer or plasticized, and optionally an elastomer which is compatible with A, as mentioned above, in order to render it less rigid. When a multilayer structure is produced according to the invention, in which the binder based on polymer A also contains fluorinated polymer, it is preferable that the fluorinated polymer present in the binder is the same as that which is found in the adjacent layer of fluorinated polymer.

The binder may consist of at least 10% by weight of polymer A, the remainder being fluorinated polymer, preferably PVDF, and an impact modifier. Success has been gained with the use of formulas containing (in % by weight):

12 to 20% of polymer A, 30 to 60% of PVDF, 20 to 40% of MBS elastomer, the total being 100%.

MBS denotes impact modifiers which take the form of particles having a core made of styrene/butadiene rubber and a shell made of acrylic/styrene.

The fuel pipes thus manufactured have an exceptional resistance to alcohols, to alcohol-containing fuels and to heat.

The Applicant has also discovered that mixtures of polymer A and fluorinated polymer were adhesion binders and, simultaneously, barrier materials towards fuel, in particular alcohol-containing fuel. Fuel pipes consisting of a layer of this binder between two layers of polyamide may also be obtained; in place of fluorinated polymer it is advantageously possible to use fluorinated polymer modified by elastomers or to add fluorinated polymer which has been thus modified and/or a polymer which is compatible with polymer A to the binder base (polymer A and fluorinated polymer).

WAYS OF PERFORMING THE INVENTION

The examples which follow illustrate the invention without, however, limiting it.

In these examples, the polymers which are incompatible with the fluorinated polymers (homo- and copolymer of VF2) are polyamides.

The composites PVDF/binder/PA are pipes, but could be films, tanks or reservoirs.

These pipes are produced by coextrusion.

This technology is described in numerous scientific works (for example in "Plastics Extrusion Technology", edited by F. Hensen, 1988, 738 pages, ISBN: 0-19-520760-2). The coextrusion line used makes it possible to produce pipes containing either 1, 2, 3, 4 or 5 layers. The pipes produced are calibrated to the following dimensions: outside diameter 8 mm and internal diameter 6 mm.

The standard used for assessing the resilience of the pipes is the standard DIN 53453. The tests are conducted at –40° C.

The permeability tests are conducted according to the "micro SEED test" method by recirculation of the test fuel in the pipes. The test fuels are:

M15, mixture of methanol (15%), isooctane (42.5%) and toluene (42.5%) by volume. In this case, the recirculation is performed at 50° C. at a pressure of 4 bar.

TF1, mixture of ethanol (9%), isooctane (45.5%) and toluene (45.5%) by volume. In this case, the recirculation is performed at 40° C. at a pressure of 2 bar.

The stripping tests on tubes (adhesion between the layers of the multilayer structure) are carried out on a dynamometer at a rate of 200 mm/min and for a stripping angle of 180°. The adhesion is measured in g/cm. The following correspondence is used:

| Interfacial Adhesion > 10,000 g/cm (Undelaminable Structure) | ++++ |
|---|---|
| 6000 g/cm < Interfacial Adhesion < 10,000 g/cm | +++ |
| 2000 g/cm < Interfacial Adhesion < 6000 g/cm | ++ |
| Interfacial Adhesion < 2000 g/cm | 0 |

EXAMPLES

TABLE 1

Monolayer pipes made of polyamide; this constitutes the reference.

| | Permeability M15 (g/m²/24 h) | Permeability TF1 [sic] (g/m²/24 h) | DIN Impact at –40° C. |
|---|---|---|---|
| Polyamide #1 | | 69.7 | 0 C/10 |
| Polyamide #2 | 420 | 137.0 | 0 C/10 |

Polyamide #1 is a PA-12 plasticized with 7.5% by mass of n-butylbenzenesulphonamide (BBSA), displaying a flexural modulus of 450 MPa (Standard ISO 178) and a notched Charpy impact strength of 9 kJ/m² at –40° C. (Standard ISO 179).

Polyamide #2 is a PA-11 plasticized with 13% by mass of BBSA, displaying a flexural modulus of 350 MPa (Standard ISO 178).

0 C/10=no breakages over 10 tests according to the standard.

TABLE 1 bis

Monolayer pipe made of PVDF

| | DIN Impact at –40° C. |
|---|---|
| PVDF #1 | 10 C/10 |

PVDF #1 is a homopolymer of fluidity 13 g/10 min at 230° C. under 5 kg (Standard ISO 1133).

This example illustrates the low strength of PVDF with respect to PA.

TABLE 2

Multilayer pipes with an inner layer of PVDF.

| Ex. | Structure of the Pipe | Permeability M15 (g/m²/24 h) | Permeability TF1 [sic] (g/m²/24 h) | DIN Impact at –40° C. |
|---|---|---|---|---|
| 1 | Polyamide #2/Binder #1/PVDF #1 (700 µm/80 µm/220 µm) | 30 | 1.4 | 0 C/10 |
| 2 | Polyamide #2/Binder #1/ PVDF #1 (820 µm/60 µm/120 µm) | | 2.6 | 0 C/10 |
| 3 | Polyamide #2/Binder #1/ PVDF #3 (750 µm/50 µm/150 µm) | | 3.8 | 0 C/10 |
| 4 | Polyamide #2/Binder #2/ Polyamide #1 (700 µm/100 µm/250 µm) | | 8.3 | 0 C/10 |
| 5 | Polyamide #1/Binder #3/ Polyamide #1 (410 µm/150 µm/410 µm) | 70 | 5.7 | 0 C/10 |
| 6 | Polyamide #1/Reground Material/Binder #1/ PVDF#2 (380 µm/380 µm/80 µm/ 150 µm) | | 3.0 | 0 C/10 |
| 7 | Polyamide #2/Binder #1/ PVDF #1/PVDF #3 (750 µm/50 µm/100 µm/ 50 µm) | | 3.2 | 0 C/10 |
| 8 | Polyamide #1/Binder #1/ PVDF #2/Binder #1/ Polyamide #1 (380 µm/65 µm/100 µm/ 65 µm/380 µm) | | <5 | 0 C/10 |

PVDF #2 is a homopolymer of fluidity 8 g/10 min at 230° C. under 5 kg (Standard ISO 1133).

PVDF #3 is a PVDF #1 modified with 2.5% of carbon black in order to render it conductive.

Binder #1 is a mixture obtained by extruding a PVDF #1 (50% by mass) of a copolymer of acrylic-imide type containing acid groups in its structure and displaying a flexural modulus of 4100 MPa (Standard ISO 178) (15%) and a methyl methacrylate-butadiene-styrene (MBS) core-shell type impact modifier (35%), on a twin-screw extruder.

Binder #2 is a mixture obtained by extruding a PVDF of fluidity 2 g/10 min at 230° C. under 5 kg (Standard ISO 1133) (90%) and some of the same copolymer of acrylic-imide type (10%), on a twin-screw extruder.

Binder #3 is similar to binder #2 but contains more acrylic-imide type copolymer (20%)

The reground material of Example 6, placed between the outer layer of PA and the layer of binder #1, corresponds to the pipe of Example 1 which has been reground and extruded in the form of granules which may be reused directly as the starting material in a multi-layer structure.

Example 1 shows that the multilayer pipe is an excellent barrier structure compared to a monolayer pipe made of PA. The pipe possesses an excellent impact behaviour.

Example 2 shows, by comparison with Example 1, that the barrier property is provided by the PVDF+binder layers.

Example 3 shows that the use of a conducting PVDF has no effect on the barrier and impact properties of the multilayer structure. The use of a conducting PVDF is useful if it is desired to obtain an antistatic fuel pipe.

Examples 4 and 5 show that the binder itself is a very good barrier material, and that a structure in which the barrier layer occupies a middle position has a good cold impact resistance.

Example 6 shows that it is possible to introduce a layer of reground material between the layer of PA and the binder layer without disrupting the impact and permeability performances.

Example 7 shows that an antistatic four-layer structure may be obtained by means of the use of a conducting layer situated inside the main PVDF layer.

Example 8 shows that a symmetrical 5-layer structure is also a good solution from the point of view of the impact and permeability properties.

TABLE 3

Interfacial Adhesion in the pipes.

| | | Adhesion (g/cm) of the binder with | |
|---|---|---|---|
| Ex. | Structure of the Pipe | Outer Face | Inner Face |
| 9 | Polyamide #2/Binder #1/ PVDF #1 | ++++ | ++++ |
| 10 | Polyamide #2/Binder #3/ Polyamide #2 | ++++ | ++++ |

Examples 9 and 10 show that the coextruded pipes have a perfect adhesion between the layers.

TABLE 3 bis

Interfacial Adhesion for films and plates.

| | Structure of Three-layer | Adhesion (g/cm) of the binder with | |
|---|---|---|---|
| Ex. | Film | Outer Face | Inner Face |
| 11 | Polyamide #1/Binder #1/ Fluorinated copolymer (200 μm/100 μm/200 μm) | ++++ | ++++ |

The fluorinated copolymer is a copolymer of VF2 (90 mol %) and VF3 (10%) obtained by a suspension process. The films used in the test are obtained by extrusion through a suitable die. The three-layer film is obtained by pressing the films on a laboratory flat press at 230° C. for 60 s.

Example 11 shows that the coextruded pipes have a perfect adhesion between the layers.

Table 4: Retention of Adhesion after Exposure to Aggressive Fluids.

The pipe tested is a Polyamide #2/Binder #1/PVDF #1 structure. Lengths of the pipes are immersed for 1000 h at 60° C. in the aggressive fluid selected. The stripping test is carried out immediately after immersion. The stripping is initiated at the weakest interface.

These examples show that a very good adhesion persists under very severe conditions.

| Test Aggressive Fluid | Adhesion |
|---|---|
| Diesel Fuel | ++++ |
| Solution containing 50% of Zinc chloride | ++++ |
| Power Assisted Steering Fluid | ++++ |
| Motor Oil | ++++ |
| Calcium Chloride | ++++ |
| Test Fuel E15 (15% of ethanol in fuel C) | +++ |
| Test Fuel M15 (15% of methanol in fuel C) | +++ |
| Solution containing 50% of Ethylene glycol | ++ |
| Fuel C (50% toluene, 50% isooctane) | ++ |
| Brake Fluid | ++ |

I claim:

1. An adhesion binder for a fluorinated polymer, which enables the fluorinated polymer to adhere to polymers with which it is incompatible, wherein the adhesion binder comprises a polymer A comprising the moieties:

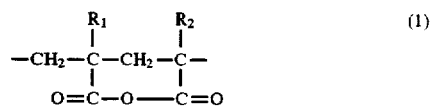

(1)

in which $R_1$ and $R_2$, which may be identical or different, represent H or a linear or branched alkyl having from 1 to 20 carbon atoms;

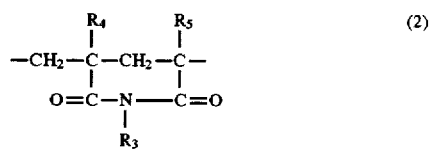

(2)

in which (i) $R_4$ and $R_5$, which may be identical or different, represent H or a linear or branched alkyl having 1 to 20 carbon atoms and (ii) $R_3$ represents H, an alkyl, cycloalkyl, aryl, alkaryl, aralkyl or a heterocycle;

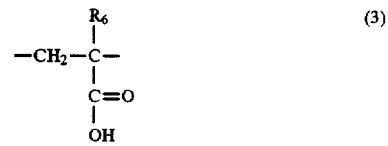

(3)

in which $R_6$ represents H or a linear or branched alkyl having from 1 to 20 carbon atoms; and

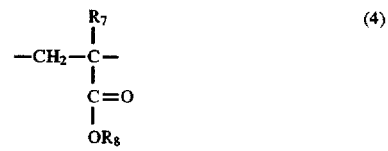

(4)

in which $R_7$ represents H or a linear or branched alkyl having from 1 to 20 carbons and $R_8$ represents a linear or branched alkyl having from 1 to 20 carbon atoms; and wherein it also comprises a second polymer in sufficient quantity to render it less rigid.

2. The adhesion binder of claim 1, wherein said second polymer is selected from the group consisting of a fluorinated polymer, a modified fluorinated polymer, and a polymer which is compatible with polymer A.

3. An adhesion binder for a fluorinated polymer, which enables the fluorinated polymer to adhere to an incompatible polymer selected from the group consisting of polyamides, copolyamides, polyamide alloys, and mixtures thereof, wherein the adhesion binder comprises a polymer A comprising the moieties:

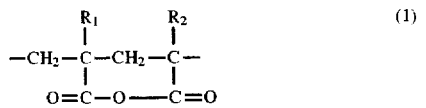

in which $R_1$ and $R_2$, which may be identical or different, represent H or a linear or branched alkyl having from 1 to 20 carbon atoms;

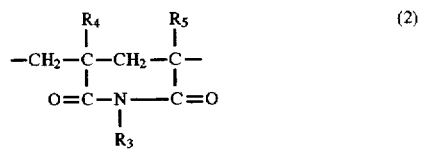

in which (i) $R_4$ and $R_5$, which may be identical or different, represent H or a linear or branched alkyl having 1 to 20 carbon atoms and (ii) $R_3$ represents H, an alkyl, cycloalkyl, aryl, alkaryl, aralkyl or a heterocycle;

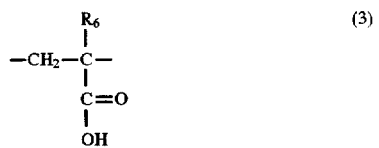

in which $R_6$ represents H or a linear or branched alkyl having from 1 to 20 carbon atoms; and

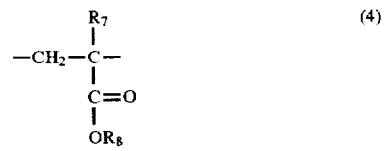

in which $R_7$ represents H or a linear or branched alkyl having from 1 to 20 carbons and $R_8$ represents a linear or branched alkyl having from 1 to 20 carbon atoms;

and wherein it further comprises a second polymer or polymer mixture in sufficient quantity to render it less rigid.

4. The adhesion binder of claim 3 wherein the fluorinated polymer is polyvinylidene fluoride (PVDF).

5. The adhesion binder of claim 3 wherein the second polymer comprises styrene/butadiene rubber and acrylic/styrene.

6. The adhesion binder of claim 3 wherein the second polymer comprises the fluorinated polymer and a styrene/butadiene rubber.

7. The adhesion binder of claim 6 wherein the fluorinated polymer is polyvinylidene fluoride.

8. The adhesion binder of claim 3 wherein the second polymer comprises a methyl methacrylate-butadiene-styrene core-shell type impact modifier.

9. The adhesion binder of claim 3 wherein the polymer A is derived from polymethyl methacrylate (PMMA).

* * * * *